United States Patent Office 3,251,735
Patented May 17, 1966

3,251,735
TETRACHLOROCYCLOPROPENE FUMIGANT
Everett E. Gilbert, Morris Township, Morris County, N.J., assignor to Allied Chemical Corporation, New York, N.Y., a corporation of New York
No Drawing. Filed Mar. 19, 1964, Ser. No. 353,238
2 Claims. (Cl. 167—39)

This invention relates to use of tetrachlorocyclopropene as fumigant and, more particularly, to a process for the control of pest organisms by subjecting the pests to the vapor of tetrachlorocyclopropene.

As is known in the art, the control of pest organisms which infest hosts such as soil, grain, fruits, vegetables, textiles, dwellings, warehouses and the like is extremely difficult in those cases where the pest organisms penetrate deeply into the interior of the host space. The use of surface poisons or pesticides for this purpose is not completely effective because of the difficulty in reaching the interior of the space. Although various fumigants have been proposed for controlling such pests, there is a need for new and highly effective fumigants.

I have now discovered that tetrachlorocyclopropene is an outstanding fumigant exerting extremely lethal effects against common penetrating pests such as those infesting plants, plant parts, grain, flour, carpets, etc.

Tetrachlorocyclopropene, a colorless and slowly volatile liquid having a boiling point of 128–129° C., may be represented by the following formula:

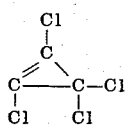

Tetrachlorocyclopropene may be produced by treating pentachlorocyclopropane with concentrated aqueous potassium hydroxide, as described in Tetrahedron Letters, 1963, page 1179.

In the process of the invention, the pests are subjected to an atmosphere comprising a lethal concentration of tetrachlorocyclopropene. This involves contacting the pests with the vapor of tetrachlorocyclopropene in the enclosure in which the pests exist.

The process of this invention is particularly applicable for combatting pest infestation in flour, grain and other stored products, whether contained in storage bins, grain elevators and the like, and in combatting plants pests. The process is also effective for control of other pests such as mites, flies, roaches, etc.

The pests are subjected to a toxic concentration of tetrachlorocyclopropene according to well-established methods known to the art. According to a typical method, the toxicant is introduced into the enclosure in which the pests exist in such manner that it is free to volatilize and permeate the atmosphere.

In general, a dosage of about 0.2 to 5 pounds of the toxicant per thousand cubic feet of enclosed space are sufficient to saturate the area and to insure effective control of the pests. The exposure time required depends upon the size of the enclosed area and the type of host, e.g., flour or grain, in the area. In an area of 1,000 cubic feet, the time generally required for most effective fumigation is from about 8 to about 24 hours. In larger areas, such as grain elevators, desirable fumigation times may be about 24 to 36 hours.

The fumigation may be carried out, for example, by placing the toxicant in an open container or shallow tray in close contact with the atmosphere surrounding the pest organisms under conditions which allow for vaporization of the toxicant.

If desired, the toxicant can be supplied in the form of a spray employing solutions or emulsions of the toxicant in organic solvents and/or in water. Carbon tetrachloride, perchloroethylene, chloroform and deodorized oils such as kerosene, xylene and methylated naphthalenes may be used as solvents.

Further, fogging may be employed if rapid dispersion of the toxicant into the atmosphere is desired. For example, deodorized kerosene containing the desired quantity of toxicant may be fogged into a warehouse from one or more points. Volatilization of the toxicant occurs in the air permitting a rapid build-up of vapor which is dispersed relatively evenly throughout the free air space in the warehouse.

In treating grain or flour, the toxicant may simply be poured or sprayed over the grain or flour where it is contained in the enclosure, such as storage warehouses, bins, elevators and the like, and allowed to vaporize and to remain in the enclosed space until it has substantially completely volatilized or permeated the space. Since the vapor is heavier than air, it tends to sink to the bottom of the enclosure and penetrate the grain or flour as it settles, killing the pest organisms.

The effectiveness of tetrachlorocyclopropene as a fumigant is illustrated by the tests described in the following examples.

Example 1

Fumigant tests were run against four important common pests: confused flour beetle larvae, lesser mealworm larvae, black carpet beetle larvae and yellow mealworm larvae. All tests were run under substantially identical conditions. In carrying out these tests, tins having perforated lids and containing the insects and small amounts of appropriate food such as grain or flour are placed in a gallon mason jar. The toxicant is pipetted onto absorbent cellulose placed in the jar in quantity to give the desired concentration of vapor in the jar. The jar is then sealed. After about a 24-hour exposure, the insect containers are removed and mortality counts are made one day later. The results of these tests are set forth in Table I.

TABLE I

| | Dose (lb./1,000 cu. ft.) | Percent Mortality | | | |
|---|---|---|---|---|---|
| | | CFBL | LML | BCBL | YML |
| Tetrachlorocyclopropene | 2.4 | 100 | 100 | 100 | 100 |
| Control | | 0 | 0 | 0 | 0 |

CFBL—Confused Flour Beetle Larvae.
LML—Lesser Mealworm Larvae.
BCBL—Black Carpet Beetle Larvae.
YML—Yellow Mealworm Larvae.

Example 2

In a second series of tests carried out as described in Example 1, except using smaller amounts of toxicant, the results set forth in Table II were obtained.

TABLE II

| | Dose (lb./1,000 cu. ft.) | Percent Mortality | | | |
|---|---|---|---|---|---|
| | | CFBL | LML | BCBL | YML |
| Tetrachlorocyclopropene | 1.2 | 100 | 100 | 100 | 100 |
| Do | 0.5 | 100 | 100 | 100 | 100 |
| Control | | 0 | 0 | 0 | 0 |

Example 3

In still another series of tests the toxicant was employed in dosage of 0.5 lb./1000 cu. ft., but the exposure time was substantially decreased. The results are given in Table III.

TABLE III

| | Exposure Period (hrs.) | Percent Mortality | | | |
|---|---|---|---|---|---|
| | | CFBL | LML | BCBL | YML |
| Tetrachlorocyclopropene | 4 | 90 | 50 | 90 | 80 |
| Do | 2 | 30 | 60 | 90 | 80 |
| Control | | 0 | 0 | 0 | 0 |

It is seen from the above table that even where the time of exposure was far below that which is commonly employed in use of fumigant, relatively high insecticidal activity was exhibited by tetrachlorocyclopropene.

*Example 4*

Table IV shows the results obtained when tetrachlorocyclopropene was employed as a fumigant for Colorado potato beetle eggs and housefly pupae. In these tests, the eggs (deposited on a small potato leaf section) and the pupae were placed in glass vials tightly stoppered with rolled absorbent cellulose. The vials were then exposed to tetrachlorocyclopropene in gallon mason jars, as described in the preceding tests.

TABLE IV

| | Dose (lb./cu. ft.) | Exposure Period (hrs.) | Percent Mortality (6 days after exposure) | |
|---|---|---|---|---|
| | | | Eggs | Pupae |
| Tetrachloro-cyclopropene | 0.5 | 4 | 100 | 100 |
| Do | 0.5 | 2 | 100 | 100 |
| Control | | | 0 | 0 |

Since various changes and modifications may be made in my invention without departing from the scope thereof, the invention is deemed to be limited only by the scope of the appended claims.

I claim:
1. A process for the control of pest organisms infesting an enclosed space which comprises subjecting said organisms to an atmosphere comprising a lethal concentration of tetrachlorocyclopropene.
2. The process of claim 1 wherein the tetrachlorocyclopropene is employed in concentration of about 0.2 to 5 pounds per thousand cubic feet of enclosed space.

No references cited.

LEWIS GOTTS, *Primary Examiner.*